Patented Oct. 28, 1941

2,260,971

UNITED STATES PATENT OFFICE 2,260,971

PROCESS OF MAKING ION-EXCHANGING PREPARATIONS AND PRODUCT THEREOF

Paul C. Goetz, Mount Holly, N. J., assignor to The Permutit Company, New York, N. Y., a corporation of Delaware No Drawing. Application November 20, 1937, Serial No. 175,733

9 Claims. (Cl. 252—193)

This invention relates to processes of making ion-exchanging preparations; and it comprises a method of making ion-exchanging preparations from carbonizable or carbonaceous materials such as coal and lignite, wherein the carbonaceous material is treated with a strong oxidizing acid such as sulfuric acid or anhydride, in conjunction with an oxidizing agent or oxidation accelerant or both, thereby securing a preparation of high exchange and cation extracting power; all as more fully hereinafter set forth and as claimed.

There have recently been developed granular carbonaceous preparations of hard rigid nature adapted for treating flows of water, characterized by being insoluble in water and dilute reagents, and by having zeolitic characteristics. That is, upon treatment of the preparations with acid or salt, they can be put in condition for removing cations from water, and can be regenerated when exhausted, by a repetition of the treatment. Upon flowing hard or soft water past the granules, the basic metallic ions (e. g. calcium or sodium) or cations are taken up by the granules, releasing hydrogen or another cation to the water. In due course, the granules become fully charged with calcium, magnesium and/or sodium from the water. Their activity can be restored by a new treatment with acid or with a saline solution, as the case may be. These preparations are particularly useful with acid regeneration; as hydrogen ion exchange materials for cation extraction. Since the cation in the water being treated are in combination with acidic ions, the acid is set free by the exchange, and if the acid is carbonic acid, $H_2CO_3$, it can be removed from the water by heating or aeration, thereby yielding a water of minimized content of dissolved matter.

A wide range of carbonaceous raw materials is available for preparation of these ion exchange materials. Certain lignites and bituminous coals give particularly good results. The best preparational processes usually involve subjecting granulated raw material to the action of sulfuric acid, or of a substituted sulfuric acid, or of sulfuric anhydride ($SO_3$). Excellent materials for the treatment of flowing water can be made by submitting coal and lignite to the action of sulfuric acid or $SO_3$. Fuming sulfuric acid may be used. Hard durable granules can be made having a high exchange power when used in the ordinary softening methods with brine regeneration and capable of use as hydrogen zeolites.

The action of sulfuric acid or $SO_3$ on the humic matter of coal is complex and little understood. There is sulfonation of aromatic constituents and esterification of unsaturated groups with production of half esters of sulfuric acid. Whatever the chemical action, there is production of wholly insoluble materials which, as stated, have ion exchange and cation extracting properties. In addition to the two chemical actions mentioned which may be grouped as sulfating, there are other actions and one is oxidation, with corresponding reduction of some portion of the acid to $SO_2$ and other reduction products of sulfuric acid.

I have discovered that the oxidizing action of the sulfuric acid is a desirable one, contrary to what might be expected; and that better products can be made by supplementing or enhancing the oxidizing action of the sulfuric acid. I sometimes employ an oxidizing agent, such as nitric acid, capable of exerting an oxidizing action independent of the action of the sulfuric acid; the oxidizing agent being used in admixture with the sulfating acid or in a separate step. Sometimes I use a substance capable of catalyzing the oxidizing action of $H_2SO_4$; e. g. alum (aluminum sulfate) and sometimes I use substances having both effects, for example potassium permanganate, which is an oxidizing agent per se and which in the presence of sulfuric acid forms manganese sulfate which catalyzes the oxidizing action of the sulfuric acid. The oxidizing agents, when such are used, tend to preclude loss of $SO_3$ as $SO_2$, which is advantageous. Almost any convenient oxidizing agent may be used; ferric salts, manganese dioxide, nitrates and nitric acid, perchlorates, chromates, hydrogen peroxide, permanganates, arsenates, arsenic acid, etc. etc. Operating under the present invention, the final product has an enhanced exchange power; that is, the amount of cations it can extract from water between regenerations is materially increased. In many cases substances prepared according to the invention have exchange powers 20 to 40 per cent or more greater than corresponding materials prepared without the aid of an oxidizing agent.

Using oxidizing agents, these can be used in admixture with the sulfuric acid during attack on the coal, or in some cases can be applied subsequently to the acid treatment, or the carbonaceous material can be treated with the oxidizing agent prior to the acid treatment. Other oxidation promoting agents are best employed in admixture with the acid, or as a preliminary treatment.

The following specific examples illustrate the process applied to a certain lignite, which is especially well adapted for making zeolitic preparations.

1. A cubic foot of Velva lignite, of average granule size 16 to 40 mesh, was treated with a mixture of 1.25 pounds $MnO_2$ and 115 pounds of 93 per cent strength sulfuric acid, for a period of 6 hours at a temperature of 150° C. The liquor was then drained off and the granules were washed and dried. A cubic foot of the preparation was treated with flowing hard water until exhausted, and was then regenerated with 8 pounds NaCl in the form of a 5 per cent solution. The exchange power was over 10,000 grains per cubic foot (expressed as $CaCO_3$) and the material retained this high value through subsequent regenerations.

In this example the manganese sulfate formed tended to catalyze the oxidizing effect of the $H_2SO_4$.

Treatment of the raw lignite with said admixed with $KMnO_4$, under similar conditions likewise yielded high grade preparations. Using such powerful oxidants as $KMnO_4$ plus $H_2SO_4$, the temperatures, etc., should be adjusted so as to prevent spontaneous ignition of the lignite from taking place.

2. A cubic foot of Velva lignite granulated to 16–40 mesh (that is, of such size that all granules pass a screen with 16 meshes to the inch but all are retained on a screen having 40 meshes to the inch) was mixed with 1.25 pounds of ferric chloride ($FeCl_3.6H_2O$) dissolved in 1.5 gallons of water, and then dried at about 110° C., without washing. The dried lignite was then intimately mixed with 115 pounds of 66° Bé. $H_2SO_4$ (93 per cent $H_2SO_4$) and the mixture of acid and lignite allowed to stand 12 hours at room temperature. The lignite was put in a lead-lined tank, the liquor drained off, and the excess free acid washed out by allowing water to percolate slowly through the mass of lignite.

The washed product was ready for use as an ion exchanging material and could be regenerated with either a metal salt as, for example, sodium chloride, or an acid, e. g. dilute HCl. Thus it can be used in either the sodium or hydrogen cycles for removing cations from water.

The exchange capacity of the product was about 8,000 grains hardness or cation removal (expressed as calcium carbonate) per cubic foot of treated lignite.

The ferric chloride in this example may be replaced by other iron, nickel, cobalt, chromium or manganese salts of oxidizing character and similar results will be obtained. For example, the lignite can be treated with $NiSO_4.6H_2O$ or $MnSO_4.6H_2O$ and dried, then treated with acid; the nickel or manganese salts in such case serving as oxidation promoting agents for the subsequently applied $H_2SO_4$.

3. A cubic foot of the same granulated Velva lignite was mixed with 115 pounds of 66° Bé. $H_2SO_4$ to which was added 1.25 pounds of commercial alum (aluminum sulfate). The mixture was allowed to stand and react for about 12 hours and then heated to dryness at a temperature not exceeding 150° C. The dried treated lignite was washed in a lead-lined tank to remove the excess free acid.

The washed product, with or without a preliminary drying at 100° C., was ready for use as an ion exchange material as in the case of the product of Example 1. The ion exchange capacity of the product was about 8,000 grains per cubic foot, regenerating with either a metal salt or an acid, using a 100 per cent excess of the regenerating substance beyond the theoretical amount.

The alum in this example served to accelerate the oxidizing effects of the $H_2SO_4$.

4. A suitable lignite in granular form was treated with a mixture of concentrated $H_2SO_4$ and concentrated $HNO_3$ (86 per cent strength) in volume ratio 17:2, and the treated material washed and dried. It had an exchange power 60 per cent higher than corresponding material prepared without the addition of $HNO_3$. Chromic acid can be substituted for nitric in this example to achieve similar results.

In the examples given, the lignite was treated with substantially anhydrous reagents. Some $H_2O$ is probably formed in the actions. Use of such salts as aluminum chloride in anhydrous form allows their water-binding capacity to be utilized to the full. However, sometimes it is desirable to apply the invention to processes wherein the coal etc. is treated with a dilute acid, and water is gradually evaporated off to concentrate the acid (the invention of another). My invention is equally well applicable to such procedures. The final products are improved.

Sulfuric anhydride ($SO_3$) in conjunction with a suitable oxidizing agent can be used in lieu of sulfuric acid. The $SO_3$ is conveniently supplied as hot vapors from the catalytic oxidation of $SO_2$ with air; the vapors containing diluent nitrogen from the air. Phosphoric anhydride can be used in lieu of sulfuric acid, advantageously at high temperatures. Moreover acids such as chlorsulfonic acid can be employed in conjunction with oxidizing agents to achieve similar results. With some of my products the exchange capacity can be enhanced still further by subjecting the acid-treated carbonaceous material to heat in the presence of the oxidizing agent, prior to the final washing.

The oxidizing salts of chromium, manganese, cobalt, nickel and iron can be regarded as oxygen accelerants as well as oxidizing agents per se and I sometimes use them in conjunction with other simple oxidizing agents such as $HNO_3$, to function as accelerants as well as oxidizers.

While certain bituminous and anthracite coals, lignites, and coke and semi-coke are especially satisfactory, my process can also be applied with advantage to other carbonaceous or carbonizable raw materials, including the following: wood, charcoal, peat, cork, pitch, tar, sugar, dextrine, certain organic acids and their salts, fats and fatty acids, thickened sulfite waste liquor, soaps; and mixtures of these materials. The carbonaceous materials can be combined with inactive carrier bodies, such as burnt clay granules etc., before, during or after the acid treatment.

What I claim is:

1. In the manufacture of a carbonaceous ion exchange material, the step of subjecting a carbonaceous material of the class consisting of anthracite coal, bituminous coal, lignites, coke, wood, charcoal, peat, cork, pitch, and thickened sulfite waste liquor to the simultaneous action of a strong sulfating agent and a relatively small proportion of at least one oxidation promoting agent selected from the class consisting of alum, hydrogen peroxide, perchlorates, arsenates, arsenic acid, manganese dioxide, chromic acid, and the oxidizing salts of chromium, manganese, cobalt, nickel and iron, for a sufficient length of time to sulfate and materially improve the ion-exchange value of the carbonaceous material.

2. A method as defined in claim 1 in which the carbonaceous material is treated with a mixture of the sulfating and oxidation promoting agents.

3. A method as defined in claim 1 in which the carbonaceous material is treated with an oxidation promoting agent prior to the treatment thereof with the sulfating agent.

4. The method of claim 1 wherein the carbonaceous starting material is a lignite.

5. The method of claim 1 wherein the carbonaceous starting material is bituminous coal.

6. The method of claim 1 wherein the carbonaceous starting material is charcoal.

7. A solid, water insoluble granular ion-exchanging carbonaceous product prepared for the treatment of water containing dissolved salts by subjecting a carbonaceous material of the class consisting of anthracite coal, bituminous coal, lignites, coke, wood, charcoal, peat, cork, pitch and thickened sulfite waste liquor to a sulfating treatment by the simultaneous action of a strong sulfating agent and a relatively small proportion of an oxidation promoting agent selected from the class consisting of alum, hydrogen peroxide, perchlorates, arsenates, arsenic acid, manganese dioxide, chromic acid, and the oxidizing salts of chromium, manganese, cobalt, nickel and iron.

8. A granular carbonaceous ion exchange material for treating water containing dissolved salts to reduce the total solids content thereof comprising a water insoluble carbonaceous solid prepared by subjecting coal to a sulfating treatment by the simultaneous action of a strong sulfating agent and a relatively small proportion of an oxidation promoting agent selected from the class consisting of alum, hydrogen peroxide, perchlorates, arsenates, arsenic acid, manganese dioxide, chromic acid, and the oxidizing salts of chromium, manganese, cobalt, nickel and iron.

9. A granular carbonaceous ion exchange material for treating water containing dissolved salts to reduce the total solids content thereof comprising a water insoluble solid prepared by subjecting lignite to a sulfating treatment by the simultaneous action of a strong sulfating agent and a relatively small proportion of an oxidation promoting agent selected from the class consisting of alum, hydrogen peroxide, perchlorates, arsenates, arsenic acid, manganese dioxide, chromic acid, and the oxidizing salts of chromium, manganese, cobalt, nickel and iron.

PAUL C. GOETZ.